United States Patent
Matsukawa et al.

(10) Patent No.: US 6,592,743 B2
(45) Date of Patent: Jul. 15, 2003

(54) PRODUCTION OF GAS SEPARATORS FOR USE IN FUEL CELLS AND EQUIPMENT USED THEREFOR

(75) Inventors: Masanori Matsukawa, Aichi (JP); Ryuta Kimata, Aichi (JP); Youhei Kuwabara, Shizuoka (JP); Kenji Dewaki, Aichi (JP); Shinji Dewaki, Gifu (JP)

(73) Assignees: Aisin Takaoka Co., Ltd., Toyota (JP); Nippon Chemical Denshi Co., Ltd., Owariasahi (JP)

( * ) Notice: Subject to any disclaimer, the term of this patent is extended or adjusted under 35 U.S.C. 154(b) by 0 days.

(21) Appl. No.: 09/892,618

(22) Filed: Jun. 28, 2001

(65) Prior Publication Data

US 2002/0050458 A1 May 2, 2002

(30) Foreign Application Priority Data

Jun. 30, 2000 (JP) ........................................ 2000-197828

(51) Int. Cl.$^7$ .............................. C25F 3/00; C25F 7/00; C25D 17/00
(52) U.S. Cl. .................... 205/666; 205/670; 205/672; 204/224 M; 204/275.1
(58) Field of Search ................................ 205/666, 668, 205/670, 672, 667, 665; 204/237, 224 R, 224 M, 275.1

(56) References Cited

U.S. PATENT DOCUMENTS

| | | | | |
|---|---|---|---|---|
| 3,847,780 A | * | 11/1974 | Burck | .................... 134/198 |
| 5,284,554 A | * | 2/1994 | Datta et al. | ............ 204/224 M |
| 5,567,304 A | | 10/1996 | Datta et al. | ................. 205/666 |

FOREIGN PATENT DOCUMENTS

| | | |
|---|---|---|
| JP | 11-329460 A | 11/1999 |
| JP | 11-329465 A | 11/1999 |

\* cited by examiner

Primary Examiner—Patrick Ryan
Assistant Examiner—Thomas H. Parsons
(74) Attorney, Agent, or Firm—Burns, Doane, Swecker & Mathis, LLP

(57) ABSTRACT

A method for producing a separator integrated with a gas flow channel of fuel cells efficiently at low costs without deteriorating processing accuracy and the like. A plane-facing electrode nozzle 30 is placed oppositely to the face to be processed, which is partially covered with a mask M, of base material B of a separator. While feeding electricity to the electrode nozzle 30 and the base material B of a separator, an electrolytic solution is injected and fed from the side of the electrode nozzle 30 to the face to be processed of the base material B from a direction that is almost perpendicular to the face. Thereby, the unmasked portion undergoes electrolytic etching with the electrolytic solution lying between the face to be processed and the electrode nozzle 30 to form recessed portions for making a gas flow channel.

20 Claims, 3 Drawing Sheets

ELECTROLYTIC SOLUTION

PRODUCTION OF GAS SEPARATORS FOR USE IN FUEL CELLS AND EQUIPMENT USED THEREFOR

BACKGROUND OF THE INVENTION

1. Field of the Invention

This invention relates to a method and equipment for producing a gas separator of fuel cells, which is integrated with a gas flow channel.

2. Description of the Related Art

Fuel cells generating electric power in response to the feed of fuel gas are generally manufactured by integrating plural electric cells. A separator lies between adjacent cells for the separation of both of them and additionally takes a role of material for forming a gas flow channel through which fuel gas is fed to the respective cells. With regard to techniques for forming a recessed portion (groove or depression) changing into a gas flow channel in a separator integrated with a gas flow channel like this, cutting method for machine cutting a metal plate changing into a base material of a separator to form grooves and the like, press working method for subjecting a metal plate changing into a base material of a separator to press working to form grooves and the like by stamping, and etching method for subjecting a metal plate changing into base material of a separator to etching to form chemically grooves and the like are known.

BRIEF SUMMARY OF THE INVENTION

According to the cutting method, processing accuracy of grooves and depressions can be improved. In contrast with this, this method has such drawbacks that if the shape of a gas flow channel becomes complicated, gross floor area becomes increased, and at the same time, great time is necessary for processing and yet, production cost becomes high. The press working method is convenient for mass production because of high processing accuracy and very small fluctuation between lots. However, this method has such drawbacks that production cost of a press die is high, work hardening as well as local change of wall thinning cannot be avoided, and sufficient guarantee cannot be given in respect the durability, i.e., changing with the lapse of time such as corrosion resistance and the like. Further, according to the above described conventional etching method, an etching solution such as electrolytic solution and the like is prepared in a fixed vessel, and a metal plate to be changed into a base material of a separator is immersed in the etching solution to carry out etching. However, such a dipping-like method shows a tendency that a long processing time is required because the etching solution as well as reaction products migrates slowly around the face to be processed. Particularly, in case of electrolytic etching by the use of electrodes, even when a feed current is increased, a fresh etching solution proportional to the current is hard to be fed to the face to be processed within a short time. Accordingly, such drawbacks are caused that a long period of time is required for making grooves, in particular in case where the groove is required to have a depth of several hundred micrometers, productivity is low, and production cost becomes high.

It is an object of the present invention to provide a method for producing a separator, of fuel cells, which is capable of producing a separator integrated with a gas flow channel efficiently at comparatively low costs and which causes no trouble in respect of processing accuracy and durability. It is also an object of the present invention to provide an equipment for producing a separator of fuel cells with the object of putting the production method into practice effectively.

According to a first aspect of the present invention, there is provided a method for producing a separator for use in fuel cells, which is integrated with a gas flow channel, and characterized by comprising: a masking step of partially masking the face to be processed of a base material of a separator; an electrolytic processing step of disposing an electrode oppositely to the masked face of the base material to be processed, injecting and feeding an electrolytic solution to the face to be processed from a direction which makes almost a right angle with the face to let the electrolytic solution lie between the face and the electrode, and electrolyzing the unmasked portion of the face under the condition of feeding electricity to the electrode and at the same time to the base material to form recessed portions for making the gas flow channel; and a mask-removing step of removing a mask from the face after forming the recessed portions.

According to this constitution, an electrolytic solution is injected and fed to the partially masked face to be processed of a base material of a separator from a direction which is almost at right angles to the face so that the electrolytic solution instantly spreads all over the area between the face and the electrode. Accordingly, the whole face to be processed can be covered with the electrolytic solution all around. In particular, as the feed direction of an electrolytic solution is almost perpendicular to the face to be processed, the electrolytic solution can be fed directly to the central area of the face too. In this point, the feed efficiency of the electrolytic solution is very good as compared with the case where the electrolytic solution is poured in parallel to the face to be processed from the end of the base material. As a result, by virtue of the feed action of the electrolytic solution induced by injection, a sufficient amount of fresh electrolytic solution is fed one after another between the face to be processed and the electrode, and at the same time, unnecessary electrolysis products are washed away over the face to the outside. Accordingly, the electrochemical reaction at the unmasked portion of the face is promoted. Consequently, desired recessed portions for making a gas flow channel can be formed on the unmasked portion of the face with high energy efficiency within comparatively short time.

According to a second aspect, in the method of the first aspect, the method is characterized in that the electrode is a plane-facing electrode to be disposed oppositely to the face to be processed at a predetermined interval, and has a nozzle to inject and feed an electrolytic solution to the face to be processed from a direction which is almost perpendicular to the face. In this method, in connection with the feature that an electrolytic solution is injected and fed to the face to be processed from a direction that is almost perpendicular to the same face, it is preferable to provide an electrolytic solution injection feed structure in the electrode facing the face to be processed. Taking this point into consideration, the second aspect is contrived.

According to a third aspect, in the method recited in the first or second aspect, the method is further characterized in that the base material of a separator has a shape of a flat plate, both faces of the base material being to be processed, and an electrolytic solution is fed toward the both faces by injection from a direction which is almost perpendicular to each of the both faces. Ac cording to this method, recessed portions for making a gas flow channel can be formed simultaneously on both sides of the flat base material of a separator, and accordingly, working efficiency improves. In addition to this, the flat base material can be held stably in position during the electrolytic processing so that electrolytic processing accuracy can be improved. Namely, in case of injecting an electrolytic solution at the same time to both the faces to be processed in/from a direction which is almost perpendicular to the respective face, both of the liquid injections are opposite to each other, and when both injection pressures are almost the same with each other, the liquid injections have a relation that they mutually support the backside of the base material and cancel mutual effects thereby. Accordingly, the flat base material can be held stably in position, and the respective face to be processed can undergo uniform electrolysis.

According to a fourth aspect, in the method of the first to third aspects, the method is characterized in that the base material is maintained almost in a vertical direction, and an electrolytic solution is fed by injection to the perpendicularly extending face to be processed from a direction that is almost horizontal. According to this constitution, an electrolytic solution sprayed to the face to be processed can flow down by itself along the face extending perpendicularly under the influence of gravity. Accordingly, an old electrolytic solution is smoothly replaced with a new one on the face to be processed, and the efficiency of electrolytic processing improves thereby.

According to a fifth aspect, in the method of the first to fourth aspects, the method is farther characterized in that an electrolytic solution once fed by injection to the face to be processed is recovered, pumped up and fed again to the face to be processed. This constitution makes it possible to use the electrolytic solution dropped out of the face to be processed again. Further, introduction of the combination of the 3rd, 4th and 5th aspects makes it possible to perform continuous production of separators of fuel cells. This will promote industrial realization of fuel cells.

According to a 6th aspect, there is provided an equipment for producing a separator of fuel cells, which is integrated with a gas flow channel, and characterized by comprising: a holder for holding a base material of a separator having a face to be processed which is partially masked; a plane-facing nozzle, used also as an electrode, disposed oppositely to the face held by the holder and having a guide passage which makes it possible to feed an electrolytic solution to the face by injection from a direction that is almost perpendicular to the face; an electricity feeding unit for supplying an electric current to the base material and also to the nozzle; a recovery unit for recovering an electrolytic solution flowed out after injecting the electrolytic solution from the nozzle to the base material; and a feed unit for feeding again the electrolytic solution recovered in the recovery unit.

By using this production equipment, the aforementioned production method can be effectively put into practice. Namely, when an electrolytic solution is injected and fed to the face to be processed of the base material held by the holder out of the plane-facing nozzle disposed oppositely to the face, unmasked portion of the face in the electrolytic solution is electrolyzed by virtue of an electric current fed by the electric feeding unit to form recessed portions for making a gas flow channel. An electrolytic solution injected to the base material of a separator and then flowed out is recovered by the recovery unit and fed again to the nozzle by the feed unit. Accordingly, this equipment makes it easy to perform continuous production of separators for use in fuel cells.

According to a 7th aspect, the equipment is characterized in that a pair of the nozzles are provided and disposed in such a way that respective injection hole of the nozzles on one side is opposite to that on another side, and the holder allows to dispose the base material between a pair of the nozzles. Technical significance of the 7th aspect is almost the same with that of the 3rd aspect aforementioned.

According to an 8th aspect, the equipment is further characterized in that the holder holds the base material in such a way that the direction of the face to be processed is disposed almost vertically. Technical significance of the eighth aspect is almost the same with that of the fourth aspect aforementioned. It is preferred to functionally connect/couple the holder recited in the 6th, 7th, and 8th aspects for holding a separator with a predetermined carrier. This makes easy to construct a mass production system of separators of fuel cells.

DETAILED DESCRIPTION OF THE INVENTION

The embodiment of the present method and the equipment used for implementing this method will be explained below.

(Outline of Equipment for Producing a Separator for use in Fuel Cells)

Figure 1:
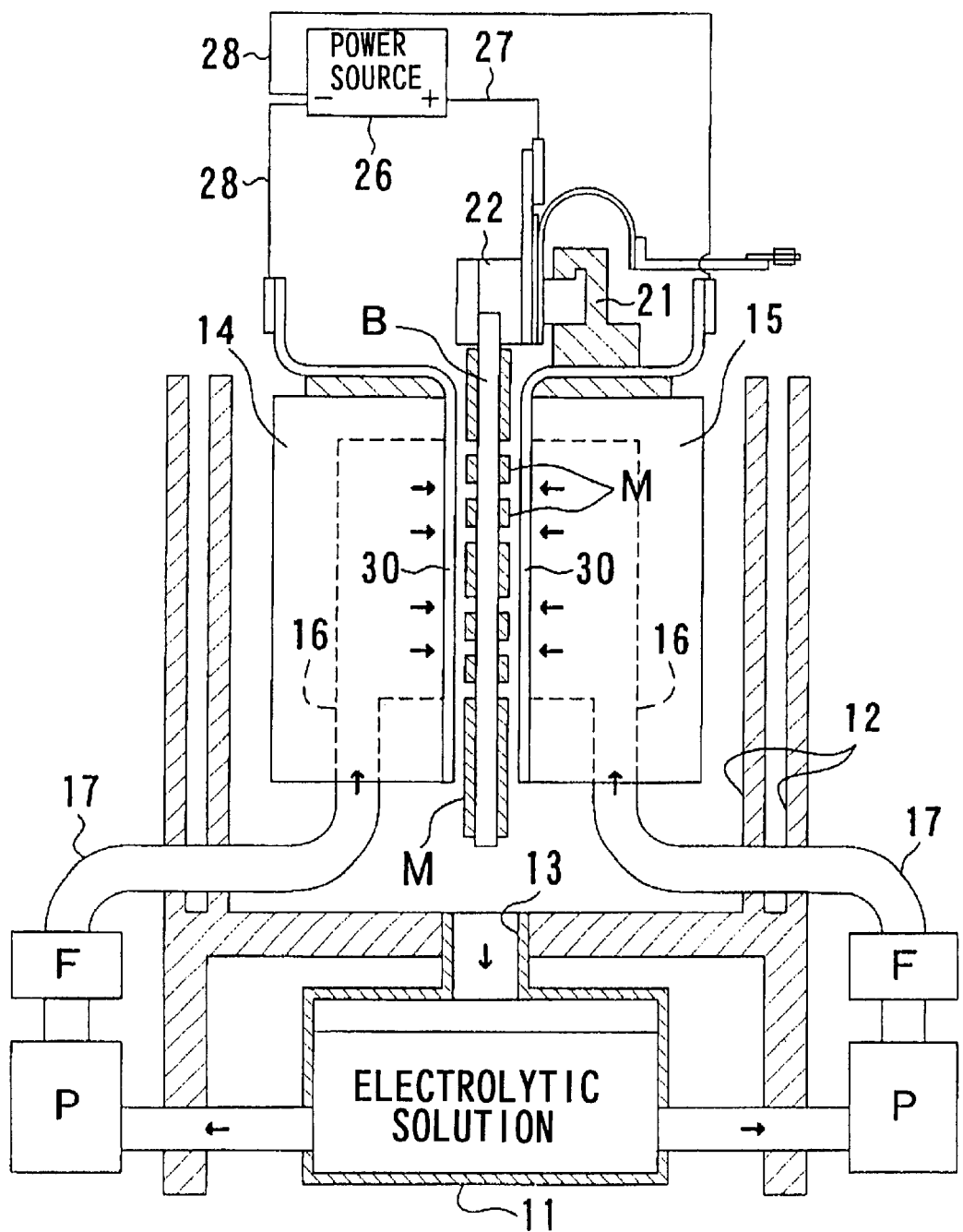
FIG. 1: front view showing an outline of an equipment for producing a separator of fuel cells

As shown in FIG. 1, an electrolytic solution storage tank 11 is placed at the lower part of an equipment for producing a separator of fuel cells. An air- or water-cooled temperature controller (not illustrated) is attached to this storage tank 11, and thereby, an electrolytic solution stored in the storage tank 11 is maintained almost at a desired temperature. A recovery tank 12 of two-tank system for recovering the electrolytic solution scattering during the feed of an electrolytic solution by injection is placed over the storage tank 11. A vertical communication passage 13 is provided in the center on the bottom wall of the recovery tank 12. An electrolytic solution is restored from the recovery tank 12 to the storage tank 11 through the vertical communication passage. Here, the recovery tank 12 and the vertical communication passage 13 constitute a recovery unit.

Figure 2:
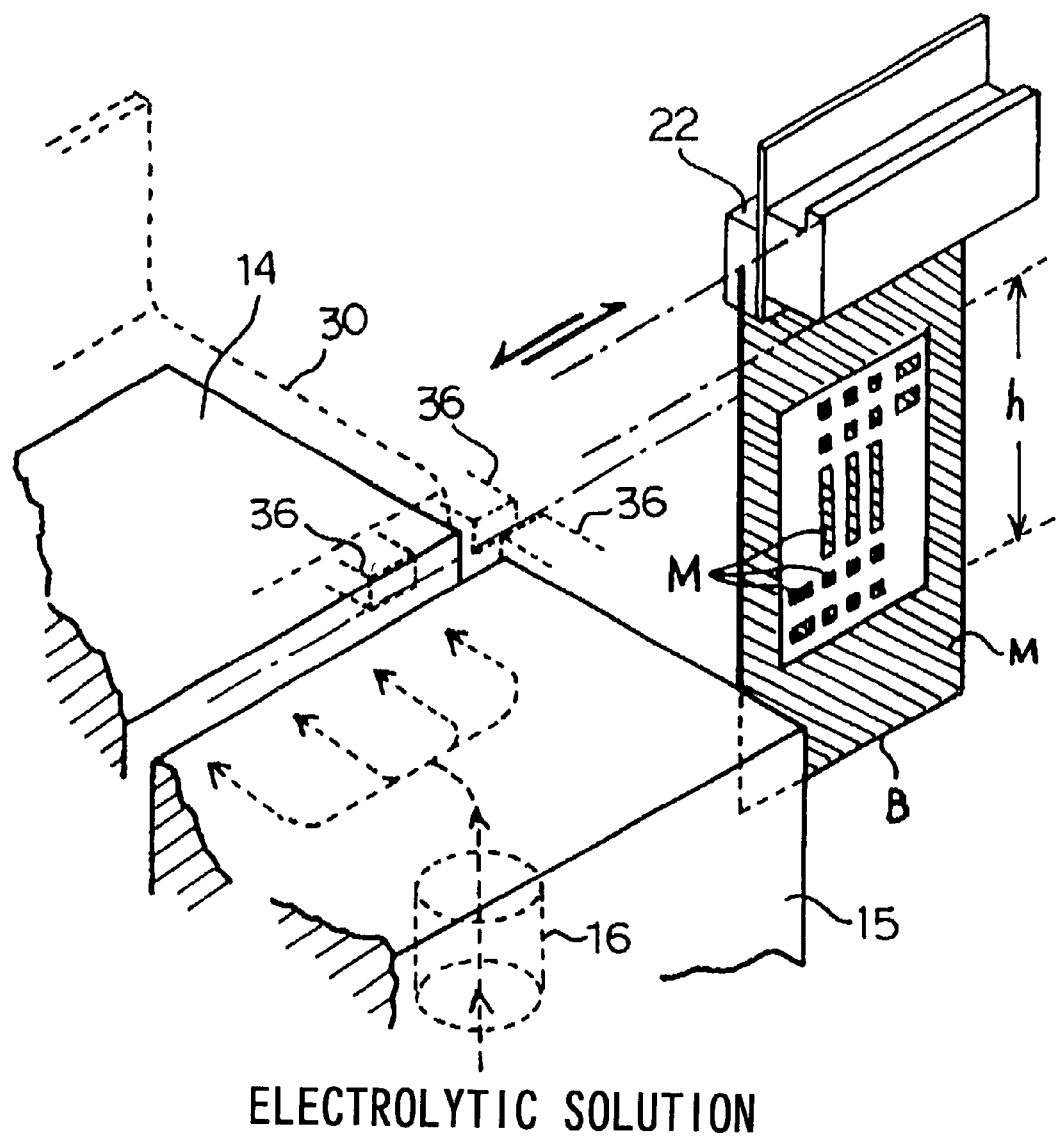
FIG. 2: perspective view showing a base material of a separator handled as a work and a part of the production equipment
Figure 4:
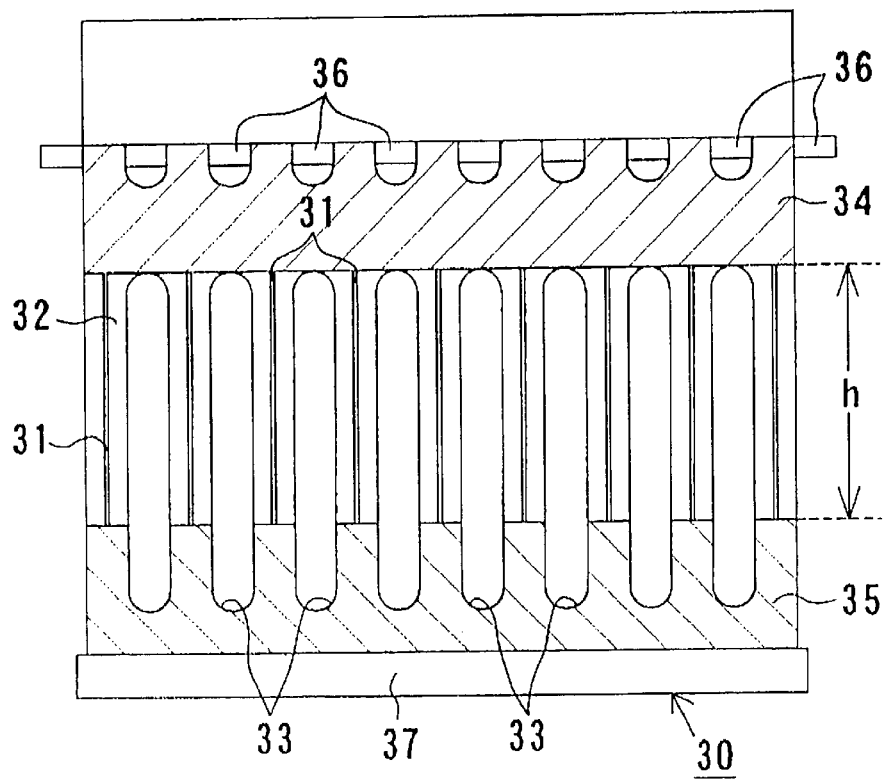
FIG. 4: front view showing an outline of the facing side of a nozzle used also as an electrode

As illustrated in FIGS. 1 and 2, a pair of sparger boxes 14, 15 are placed side by side over the recovery tank 12. These sparger boxes 14, 15 are positioned at the same height, horizontally lined up at the same level apart from each other, and have a nozzle 30 used also as an electrode (hereinafter referred to "electrode nozzle") on the side facing the side of the other sparger box. Though detailed structure of the electrode nozzle 30 will be explained below, plural slit-shaped injection holes (openings) 31 for injecting an electrolytic solution are provided as shown in FIG. 4. Inside each of the sparger boxes 14, 15, an inner passage 16 to guide an electrolytic solution aloft from the lower position is formed and communicated with the respective slit-shaped injection openings 31. Further, the inner passage 16 of the sparger boxes 14, 15 is connected to the storage tank 11 through a feed passage 17 provided with pump P (preferably chemical pump) and filter F. And, an electrolytic solution stored in the storage tank 11 is drawn up by the works of the pump P and fed to the respective slit-shaped injection holes 31 of the electrode nozzle 30 through the feed passage 17 and the inner passage 16. The filter F removes impurities mingled in an electrolytic solution and unnecessary electrolysis products. Here, the storage tank 11, the feed passage 17 and the pump P constitute a feed unit of an electrolytic solution, and the inner passage 16 and the slit-shaped injection holes 31 constitute a guide passage of the electrode nozzle 30 which makes it possible to inject and feed an electrolytic solution to the face to be processed in/from a direction which is almost perpendicular to the face.

Figure 3:
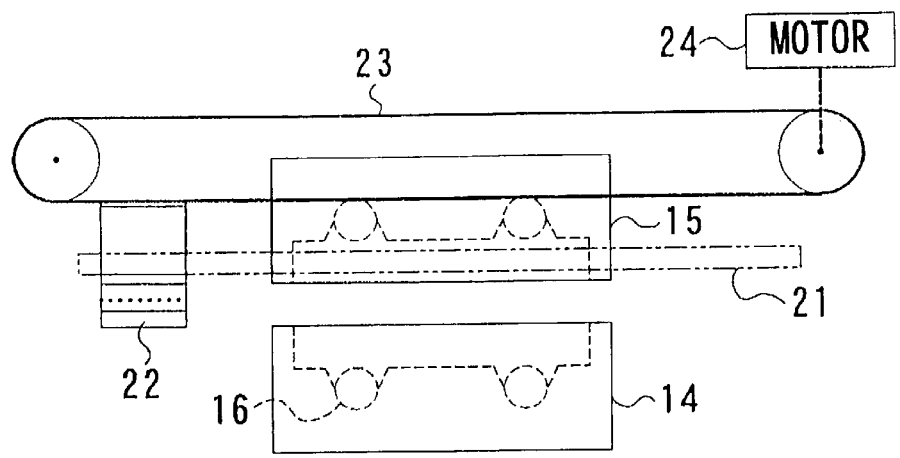
FIG. 3: top view showing an outline of a work holder carrying system

As shown in FIG. 1, a guide rail 21 extending in a direction making a right angle with the page surface is provided over the sparger boxes 14, 15. A work holder 22 serving as a holder is mounted on this guide rail 21 in such a way that it can reciprocate. As shown in FIG. 3, the work holder 22 is fixed to a part of caterpillar-like chain or wire (endless member) 23, and reciprocates on the guide rail 21 in response to the transfer of the chain or wire 23 in the normal or opposite direction by a driving motor 24. As illustrated in FIGS. 1 and 2, the work holder 22 grasps an end (top end) of base material B of a separator handled as a work and holds the base material B in such a manner as to suspend it vertically. The base material B held by the work holder 22 is placed almost in the middle of the mutually facing sides of a pair of the electrode nozzles 30 and can reciprocate between both of the electrode nozzles 30 in response to the reciprocation of the work holder 22. As such, the guide rail 21, the chain or wire 23, and the driving motor 24 constitute a carrier connected with the work holder 22.

As shown In FIG. 1, this production equipment has a direct voltage source 26 serving as an electricity feeding unit. The positive electrode of the direct voltage source 26 is connected to the work holder 22 through flexible electricity-feed wire 27. On the other hand, the negative electrode of the direct voltage source 26 is connected through two flexible electricity-feed wires 28 to the respective top end of the electrode nozzles 30 correspondingly. Feeding electricity with the direct voltage source 26 gives electric potential difference between the electrode nozzle 30 and the base material B of a separator, and thereby electric field is generated between the face to be processed of the base material B and the facing side of the respective electrode nozzles 30.

FIG. 4 is a schematic view showing the facing side of the electrode nozzle 30 facing the face to be processed of the base material B of a separator. As shown in FIG. 4, plural line of slit-shaped injection holes 31 (9 lines in this embodiment) are made through the facing side 32 of the electrode nozzle. Each of the injection holes 31 extends vertically, and the length h thereof along the vertical direction is designed so as to coincide with the height h of the face to be processed (portion necessary to be processed) of the base material of a separator (cf. FIG. 2). In other words, the electrode nozzle 30 is a plane-facing one almost all the facing side 32 of which can be designed so as to face the face to be processed. The width of the respective slit-shaped injection holes 31 is set up in the range of from 0.5 to 2.5 mm, preferably at 1.5 mm. As described above, the respective slit-shaped injection holes 31 are communicated with the inner passage 16 of the sparger boxes correspondingly. Thereupon the electrode nozzle 30 is attached to the sparger box to have high sealing strength so as not to let an electrolytic solution leak elsewhere other than feeding it through the inner passage 16 to the respective injection holes 31. Further, the facing side 32 of the electrode nozzle has escape channels 33 between adjacent slit-shaped injection holes 31. These plural escape (discharge) channels 33 function as an electrolytic solution discharging promotion unit for the promotion of capturing an electrolytic solution flowed out seeking refuges and discharging it smoothly into the recovery tank when the electrolytic solution is injected from the respective slit-shaped injection holes 31 toward the base material B of a separator. Here, the depth of the escape channel 33 is about 20 mm.

Further, masks 34, 35 are formed on the area higher than the virtual line formed by connecting the top ends of the respective slit-shaped injection holes 31 (upper area with diagonal lines shown in FIG. 4) and on the area lower than the virtual line formed by connecting the bottom ends of the respective slit-shaped injection holes 31 (lower area with diagonal lines shown in FIG. 4). These masks 34, 35 aim at improving the strength or efficiency of the electric field formed between: an exposed area (substantially negative electrode), along the slit-shaped injection holes 31 after sealing an area unnecessary to form electric field for the base material B of a separator handled as a work as strictly as possible; and the face to be processed of the base material B (substantially positive electrode) in case of letting both of them facing each other. The thickness of the masks 34, 35 is very thin, and accordingly, a non-contact state of the electrode nozzle 30 and the base material B of a separator is never disturbed. The electrode nozzle 30 may be made of materials having conductivity as well as corrosion resistance. These materials suitable for forming the electrode include platinum, graphite, or platinum-plated metal of stainless steel or titanium-based alloy or metal. Then, plural work guides 36 are arranged around the top of the mask 34 horizontally in one line. In addition, a work guide 37 extending horizontally is placed under the mask 35. These work guides 36, 37 come into contact with the surface of a work during electrolytic etching to guide its transfer and at the same time support it from their side to prevent its wobble. The work guides 36, 37 are placed on the electrode nozzle 30 in this embodiment, but their placement has no connection with the electrode functions.

(Manufacturing Method of a Separator for use in Fuel Cells)

Next, a method for producing a separator, integrated with a gas flow channel, of fuel cells using the above described production equipment will be explained below. In the following explanation, explanations on known, conventional methods in producing a separator of fuel cells will be omitted or shortened.

(Preparation Step)

Base materials B used for starting material of forming a separator, integrated with a gas flow channel, of fuel cells are prepared beforehand, for instance, by cutting metal plates. The base materials B of a separator are made of electro-conductive material. Usable electro-conductive materials include metal of aluminum series, stainless steel series, titanium series or alloy thereof. Preferable base materials B of a separator are planar metal plates. In this embodiment, a stainless steel plate (SU304) of 1.5 mm in thickness, 430 mm in width, and 300 mm in height is employed for the base material B. On the face (surface and back face) to be processed of the base material B a mask is formed after pretreatment such as degreasing, washing and the like. As shown in FIGS. 1 and 2, a mask M is formed on the unetching portion of the base material B, i.e., on the portion remaining as a projection or land (plateau) portion after forming a gas flow channel. As for masking materials general masking materials for electro- and electroless plating can be used. In forming a mask, for instance, such technique may be employed that acid-resistive etching resist material, diluted by predetermined diluting solvent to control its viscosity moderately, is printed on the face to be processed of the base material B by a screen process followed by drying. Here, UV-setting resist material may be used in place of the acid-resistive etching resist material. The thus prepared base material B with a mask is grasped on the top portion and hanged vertically by the work holder 22.

On the other hand, an electrolytic solution, which is a liquid for processing used in electrolytic etching, is prepared in the storage tank 11. As electrolytic solutions, those generally known as a processing liquid for electrolytic etching can be used, and, for example, it is recommended that plural acids are selected from the group consisting of nitric acid, hydrofluoric acid, phosphoric acid, hydrochloric acid and sulfuric acid and mixed with each other to prepare an acid mixture, and thereafter that small amount of additives for controlling etching rate and the like are added to the mixture (to the extent that the volume of the additives is 0.1 to 0.5 ml relative to 1 liter of the mixture). Alternatively a sodium nitride solution may be used. The temperatures of an electrolytic solution can be controlled voluntarily if they are in the range of from 30 to 65° C., but it is preferable to maintain the temperature as constantly as possible during electrolytic etching.

(Electrolytic Processing Step)

The base material B, of a separator with a mask, held by the work holder 22 is carried to the place between a pair of the electrode nozzles 30 provided on the respective sparger boxes 14, 15 resulting from driving by the driving motor 24. When the base material B is placed between both of the electrode nozzles 30 while keeping non-contact state, preferable distance between the face to be processed of the base material B and the facing side 32 of the electrode nozzle facing the face is adjusted to 0.1 to 30 mm (1.0 mm in this embodiment). If this distance is less than 0.1 mm, the base material B and the electrode nozzle 30 will come into contact with each other, and spark will be easily caused thereby. In contrast with this, if the distance exceeds 30 mm, the resistance of an electrolytic solution becomes increased to decrease extremely electrolytic etching efficiency, and accordingly, this condition is not practical. The facing side 32 of the electrode nozzle 30 and the face to be processed of the base material B are maintained in parallel to each other in this embodiment. However, in case of making a slant to the groove in its depth direction, the facing side 32 and the face to be processed of the base material B may be set at an adequate tilt angle.

While the face to be processed of the base material B and the electrode nozzle 30 are kept to face each other, an electrolytic solution is injected and fed to the base material B from each of the electrode nozzles 30, and at the same time an electric current is supplied by the direct voltage source 26 to the base material B and to the electrode nozzles 30. Preferable current density of the direct current supplied by the direct voltage source 26 during electrolytic etching is 0.5A to 45A per square centimeter (18A/cm$^2$ in this embodiment). The feed time is about 5 minutes in this embodiment, but can suitably be changed depending on current density and the depth of grooves.

The injection pressure and injection flow rate of an electrolytic solution injected by the electrode nozzles 30 are possible to be determined voluntarily by controlling the compression power of the pump P. An electrolytic solution is injected from the respective slit-shaped injection holes 31 of the electrode nozzle 30 to the face to be processed of the base material B in a direction that is almost at right angles to the same face (horizontal direction in FIG. 1). This injection is done all at once from two electrode nozzles 30 of right and left sides. As shown in FIG. 4, the respective slit-shaped injection holes 31 extend vertically, and are arranged horizontally (in a direction to which the base material of a separator is carried) at predetermined intervals apart from each other. As a result, most part of the electrolytic solution injected from the respective injection holes 31 collides against the face to be processed, then spreads from side to side seeking refuges rather than dropping directly, and comes into escape channels 33. The electrolytic solution entering the escape channels 33 drops vertically along these escape channel 33 and is collected into the recovery tank 12.

In this way, the electrolytic solution, fed by injection from the left and right electrode nozzles 30 to the left and right faces to be processed of the base material B, spreads instantly (within very short time) all over the respective faces to be processed all around and is used for electrolytic etching. Similarly, electrolysis products produced by electrolytic etching are washed away with the electrolytic solution injected and fed successively from the electrode nozzles 30 and never stay between the face to be processed and the electrode nozzle thereby. Accordingly, electrolytic etching and electrolytic polishing of the face to be processed with an electrolytic solution are accomplished at high efficiency. In addition, the base material B of a separator may be stopped only for required times (about 5 minutes in this embodiment) while placing between a pair of electrode nozzles 30, but the work holder 22 may be made to reciprocate periodically during electrolytic etching to let the base material B go back and forth between a pair of electrode nozzles 30.

(Post-Treatment Step)

After accomplishing the electrolytic etching, under the condition that the base material B of a separator is detached from the work holder 22 or remains being attached to the work holder 22 to which no electricity is fed on line, washing for removing the attached electrolytic solution is done, and also treatment for removing the mask M is done. The base material B after removing the mask M has recessed portions (grooves or depressions) formed on its unmasked portion and changes into a separator integrated with a flow channel of desired shape. According to the present embodiment, in the unmasked portion of the base material for use in separators, depressions having almost uniform depth of 0.4 mm (error range: 0.02 mm or less) were formed. Further, fine glossiness was observed at the bottom of these depressions. In this way, expected electrolytic etching and at the same time electrolytic polishing against the bottom face and other exposed faces were accomplished. The thus obtained separator integrated with a flow channel is then subjected to press working and the like for finally adjusting its shape if necessary.

(Effect)

According to the present embodiment, the following effect can be taken.

Because of injecting and feeding an electrolytic solution to the respective faces to be processed of masked base material B of a separator from directions perpendicular thereto during electrolytic etching, the electrolytic solution instantly spreads all over the faces to be processed all around, and it is effectively put to use for electrochemical reaction such as elution of metal ion and the like. In other words, necessary and sufficient electrolytic solution in respect of quantity and concentration are always fed to the faces to be processed. As a result, a separator for use in fuel cells can be produced efficiently at low costs without lowering the processing accuracy of the separator integrated with a flow channel.

Even if electrolysis products are produced in the space area between the face to be processed and the electrode nozzle 30 during electrolytic etching, these electrolysis products are washed away together with an electrolytic solution into the recovery tank 12 owing to the power of injection. Accordingly, electrolysis products, which cause the deterioration of electrolytic etching efficiency, are never precipitated nor stayed near the faces to be processed (i.e., the faces under processing), and it becomes possible to make the distance between the electrode nozzle 30 and the face to be processed small thereby. Accordingly, energy efficiency in electrolytic etching can be enhanced to shorten electrolytic processing time and to improve productivity thereby.

The face to be processed exist son both of the surface and back face of the base material B, and an electrolytic solution is injected and fed at the same time to both of the faces to be processed from right and left. In addition, the respective injection directions are at right angles to the faces to be processed. Accordingly, liquid injections carried out from right and left are opposite to each other, and the respective injection pressures are the same with each other. On this account, the liquid injections performed from right and left have such relation that they mutually support the back of the base material B and cancel the effects of the injection pressure. Therefore, holding of the base material B is never unstabilized through the influence of liquid injection, and the stability in position of the base material B becomes enhanced. Then, if the position of the base material B becomes stabilized during processing, the intervals of the respective face to be processed and electrode nozzle 30 facing it are kept evenly, and the processed depths of recessed portions are never dispersed between right and left thereby.

The work guides 36, 37, which are placed on the right and left electrode nozzles 30 respectively during electrolytic etching, support the base material B of a separator from right and left sides to prevent its wobble from side to side thereby. Such a mechanical device makes the stability in position of the base material B enhanced during processing and the accuracy of groove processing improved.

In this embodiment, the base material B of a separator is held by or hung on the work holder 22 and made possible to be transferred together with the work holder 22 along the guide rail 21. Accordingly, if a lot of work holders 22 are prepared beforehand, continuous processing of the base material B can be made. This is far and away more efficacious method than conventional etching method of using batch-type fixed electrolysis vessels, and will open a gate to mass production of a separator for use in solid-polymer-type fuel cells.

A separator integrated with a channel flow produced by applying the present method has the following features or merits when evaluated as final products. There is almost no strain as well as the depth of recessed portions is finished uniformly as compared with press molding products. On this account, control of gas flow characteristics after assembling fuel cells and countermeasures for preventing dewdrops of water vapors occurring in a gas flow channel are easy to be made as the designer intended. In this way, electric cell properties can be improved. Further, on account that there is almost no strain, deterioration of sealing property due to accumulation of strains will not be caused even in case of integrating a lot of electric cells. Moreover, the produced separator can be imparted pressure uniformly to the respective faces of electrodes having an interposed, proton-permeable solid polymer film in an electric cell. Accordingly, local damage of the electrodes can be prevented before it happens, and an electric cell performance can be improved thereby.

(Another Embodiment)

The above-described embodiment may be modified as follows.

In the above embodiment, guide rail 21 and work holder 22 are placed over sparger boxes 14, 15. However, it is permissible to place the guide rail 21 and the work holder 22 below the sparger boxes 14, 15, and to grasp the lower end of the base material B of a separator with the work holder 22. On the other hand, the base material B may be held horizontally in such a way as to lie down in place of being held vertically. In this case, the feed by injection of an electrolytic solution points to the vertical direction. As such, the base material B and the electrode nozzle 30 facing it may be positioned at any angle relative to the ground.

In the above-described embodiment, one set of sparger boxes constituted by a pair of sparger boxes 14, 15 standing in a line right and left are used. However, plural sets of sparger box pairs of the similar kind may be arranged in series to establish a linear passage for carrying the base material B through there. If it is done in this way, it becomes possible to deal with electrolytic etching in such a manner as to produce by flow production while a lot of the base materials B are carried in one direction. Accordingly, mass production of separators for use in fuel cells at low costs becomes possible.

It is unnecessary to integrate the above-described work guides 36, 37 with the electrode nozzle 30, and the work guides 36, 37 may be separated from the electrode nozzle 30.

The term "electrolytic processing" used in this specification has wide meaning that includes "electrolytic etching" and should not be read as narrow literal sense of the word only.

The meritorious effect of the present invention are summarized as follows.

As explained in detail in the above, according to the production method of the present invention, a separator integrated with a flow channel for use in fuel cells can be produced efficiently at comparatively low costs as well as a separator of fuel cells that never causes a problem in respect of processing accuracy and durability. Then, according to the production equipment of the present invention, the aforementioned production method can be put into practice.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method for producing a gas separator for use in fuel cells which is integrated with a gas flow channel comprising:
   (a) a masking step of partially masking faces to be processed on opposite sides of base material of a separator;
   (b) an electrolytic processing step of disposing a pair of electrodes oppositely to the masked faces of said base material to be processed, feeding an electrolytic solution by injection to the entirety of both of said faces from a direction which is almost perpendicular to said faces to let said electrolytic solution lie between said faces and said electrodes, and electrolyzing the unmasked portion of said faces while feeding electricity to said electrodes and to said base material to form recessed portions for making said gas flow channel; and
   (c) a mask-removing step of unmasking said faces after forming said recessed portions.

2. The method as defined in claim 1, wherein said electrodes are plane-facing electrodes to be disposed oppositely to said faces at a predetermined interval, and have a nozzle to feed the electrolytic solution.

3. The method as defined in claim 2, wherein said base material has a shape of a flat plate.

4. The method as defined in claim 3, wherein the electrolytic solution fed by injection to said faces is recovered, pumped up and fed again to said faces.

5. The method as defined in claim 2, wherein said base material is maintained almost in a vertical direction, and the electrolytic solution is injected and fed to said faces which also extend in the vertical direction from a direction that is almost horizontal.

6. The method as defined in claim 2, wherein the electrolytic solution fed by injection to said faces is recovered, pumped up and fed again to said faces.

7. The method as defined in claim 1, wherein said base material has a shape of a flat plate.

8. The method as defined in claim 7, said base material is maintained almost in a vertical direction, and an electrolytic solution is injected and fed to said faces which also extend in the vertical direction from a direction that is almost horizontal.

9. The method as defined in claim 7, wherein the electrolytic solution fed by injection to said faces is recovered, pumped up and fed again to said faces.

10. The method as defined in claim 1, wherein said base material is maintained almost in a vertical direction, and the electrolytic solution is injected and fed to said faces which also extend in the vertical direction from a direction that is almost horizontal.

11. The method as defined in claim 1, wherein the electrolytic solution fed by injection to said faces is recovered, pumped up and fed again to said faces.

12. The method as defined in claim 1, including recovering at least a portion of the electrolytic solution that has been fed by injection to said faces in escape channels and directing the recovered electrolytic solution to a recovery tank.

13. The method as defined in claim 1, wherein the electrolytic solution is fed by injection to locations on said faces that are opposite one another to cancel effects of injection pressure.

14. The method as defined in claim 1, wherein the base material is held on a holder and is moved to a position at which the electrolytic solution is fed by injection to both the faces of the base material.

15. The method as defined in claim 1, wherein the electrolytic solution is fed by injection to the entirety of both of said faces by way of a plurality of slit-shaped injection holes facing towards each of said faces of the base material.

16. An equipment for producing a separator of fuel cells which is integrated with a gas flow channel, said equipment comprising:
   a holder for holding a base material of a separator having a pair of faces to be processed which are partially masked;
   a pair of plane-facing nozzles each used also as an electrode and disposed opposite to and over the entirety of one of said faces, each nozzle comprising a plurality of slit-shaped injection holes, the pair of nozzles being disposed in such a way that respective injection holes on one side of the base material are opposite to injection holes on an opposite side of the base material, and said holder being adapted to dispose said base material between the pair of nozzles, said nozzles having a guide passage adapted to permit injection and feeding of an electrolytic solution to said faces from opposite directions almost perpendicular to said faces;
   an electricity feeding unit for supplying an electric current to said base material and also to said nozzle;
   a recovery unit for recovering electrolytic solution after injection from said nozzle to said base material; and
   a feed unit for feeding the electrolytic solution recovered in said recovery unit.

17. The equipment as defined in claim 16, wherein said holder holds said base material so that said faces are disposed almost vertically.

18. The equipment as defined in claim 16, wherein said holder holds said base material so that said faces are disposed almost vertically.

19. The equipment as defined in claim 16, wherein the slit-shaped injection holes have a width between 0.5 mm and 2.5 mm.

20. The equipment as defined in claim 16, including a drive device connected to the holder to move the holder to a position between the pair of nozzles.

* * * * *